United States Patent
Hu et al.

(10) Patent No.: US 10,097,547 B2
(45) Date of Patent: Oct. 9, 2018

(54) SECURITY VERIFICATION METHOD, APPARATUS AND TERMINAL

(71) Applicant: TENCENT TECHNOLOGY (SHENZHEN) COMPANY LIMITED, Shenzhen, Guangdong (CN)

(72) Inventors: Yuhui Hu, Shenzhen (CN); Longpan Zhang, Shenzhen (CN); Shan Lu, Shenzhen (CN); Zhipeng Zhou, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 80 days.

(21) Appl. No.: 14/972,381

(22) Filed: Dec. 17, 2015

(65) Prior Publication Data

US 2016/0105436 A1 Apr. 14, 2016

Related U.S. Application Data

(63) Continuation of application No. PCT/CN2014/070106, filed on Jan. 3, 2014.

(30) Foreign Application Priority Data

Jun. 18, 2013 (CN) .......................... 2013 1 0242942

(51) Int. Cl.
*H04L 29/06* (2006.01)
*H04L 9/32* (2006.01)
*G06F 21/42* (2013.01)

(52) U.S. Cl.
CPC .......... *H04L 63/0876* (2013.01); *G06F 21/42* (2013.01); *H04L 9/3226* (2013.01); *H04L 63/126* (2013.01)

(58) Field of Classification Search
USPC .......................................................... 713/167
See application file for complete search history.

(56) References Cited

U.S. PATENT DOCUMENTS

| | | | |
|---|---|---|---|
| 2006/0171536 A1* | 8/2006 | Lim | H04L 63/0414 380/247 |
| 2012/0216292 A1* | 8/2012 | Richardson | H04W 12/12 726/27 |

FOREIGN PATENT DOCUMENTS

| | | |
|---|---|---|
| CN | 1816216 A | 8/2006 |
| CN | 102105920 A | 6/2011 |

(Continued)

OTHER PUBLICATIONS

International Search Report for PCT/CN2014/070106 dated Mar. 27, 2014.

(Continued)

*Primary Examiner* — Jeffrey Pwu
*Assistant Examiner* — Samuel Ambaye
(74) *Attorney, Agent, or Firm* — Sughrue Mion, PLLC

(57) ABSTRACT

Disclosed are a security verification method, apparatus, and terminal. The method includes: acquiring a first verification code and prompting the first verification code, the content of the first verification code describing scenario information that is simple for a user to understand, and triggering the user to send a second verification code over a user terminal; receiving the second verification code, and acquiring an ID of the user terminal sending the second verification code; and obtaining a security verification result according to two verification results of the second verification code and the corresponding ID. A first verification code describing scenario information that is simple for a user to understand is displayed such that the user understands the scenario information corresponding to the first verification code and (Continued)

unauthorized users are prevented from stealing the verification codes using similar websites.

18 Claims, 6 Drawing Sheets

(56) References Cited

FOREIGN PATENT DOCUMENTS

| WO | 2010/014386 A1 | | 2/2010 | | |
|---|---|---|---|---|---|
| WO | WO2010014386 | * | 2/2010 | ........... | H04L 9/3271 |
| WO | WO 2010014386 A1 | * | 2/2010 | ........... | H04L 9/3271 |

OTHER PUBLICATIONS

Communication dated Nov. 16, 2017 from the State Intellectual Property Office of the P.R.C. in counterpart Chinese application No. 201310242942.6.

\* cited by examiner

SECURITY VERIFICATION METHOD, APPARATUS AND TERMINAL

This application claims priority to Chinese Patent Application No. 201310242942.6, filed before Chinese Patent Office on Jun. 18, 2013, and entitled "SECURITY VERIFICATION METHOD, APPARATUS AND TERMINAL", which is incorporated herein by reference in its entirety.

TECHNICAL FIELD

The present disclosure relates to the field of information security technologies, and particularly to a security verification method and apparatus.

BACKGROUND

The Internet is providing more and more services. However, thefts of identifies of authorized users for enjoying services thereof are becoming a commonplace. To interrupt services provided for the authorized users whose identifies or services have been stolen, a serving terminal providing services performs security verification to the identities of the users before providing services, to confirm the user identities. Accordingly, a security verification method is critical to ensuring the authenticity of a user to which services are provided.

At present, there are two security verification ways. In the first security verification way, security verification is performed using a user name and password; whereas in the second security verification way, security verification is performed using second identity verification. With regard to the first security verification way, before a serving terminal provides services, a user is required to input a user name and password capable of identifying the identity of the user over a user terminal; and then the serving terminal provides, after verifying that the user name and password input by the user are correct, services for the user, where the password is made up of letters and digits. With regard to the second security verification way, before a serving terminal provides services, in addition to the case that a user is required to input a user name and password capable of identifying the identity of the user over a user terminal, the serving terminal sends a random verification code to the user terminal or other apparatuses designated by the user separately; then, the user inputs the received verification code over the user terminal; and the serving terminal verifies whether or not the verification code input by the user is correct after verifying that the user name and password input by the user are correct, and then provides services for the user if the verification code input by the user is also correct.

During implementation of the present disclosure, the inventor finds that the above security verification methods have at least the following defects:

Since the password in the first security verification way is composed of letters and digits, it is quite difficult for the user to memorize the password and the password is likely to be intercepted and cracked by Trojan. As a result, the password is subject to thefts. With regard to the second security verification method, unauthorized users often steal a verification code of a user by creating a website which is the same as that provided by a service provider and inducing the user to enter the verification code in the website created by the unauthorized users, and further steal the identity of the user by using the stolen verification code before the verification code becomes invalid. Consequently, the function of the security verification is weakened.

SUMMARY

In view of the above, embodiments of the present disclosure provide a security verification and apparatus. The technical solutions are described as follows.

In a first aspect, a security verification method is provided, including:

acquiring a first verification code and prompting the first verification code, where the content of the first verification code describes scenario information that is simple for a user to understand, and triggering the user to send a second verification code over a user terminal;

receiving the second verification code from the user over the user terminal, and acquiring an ID of the user terminal sending the second verification code; and verifying the second verification code, verifying the ID of the user terminal, and obtaining a security verification result according to two verification results.

In a second aspect, a security verification apparatus is provided, including:

a first acquiring module, configured to acquire a first verification code;

a prompting module, configured to prompt the first verification code acquired by the first acquiring module, where the content of the first verification code describes scenario information that is simple for a user to understand, and trigger the user to send a second verification code over a user terminal;

a receiving module, configured to receive the second verification code sent by the user over the user terminal;

a second acquiring module, configured to acquire an ID of the user terminal sending the second verification code;

a first verifying module, configured to perform verification of the second verification code;

a second verifying module, configured to perform verification of the ID of the user terminal; and a verifying module, configured to obtain a security verification result according to two verification results obtained by the first verifying module and the second verifying module.

The technical solutions according to the embodiments of the present disclosure have the following advantages:

A first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced.

BRIEF DESCRIPTION OF THE DRAWINGS

For a better understanding of the technical solutions in the embodiments of the present disclosure, the accompanying drawings for illustrating the embodiments are briefly described below. Apparently, the accompanying drawings in the following description illustrate only some embodiments of the present disclosure, and persons of ordinary skill in the art may derive other accompanying drawings based on these accompanying drawings without any creative efforts.

DETAILED DESCRIPTION

To make the objects, technical solutions and advantages of the present disclosure clearer, the implementation manners of the present disclosure are described in detail with reference to the accompanying drawings.

Figure 1:
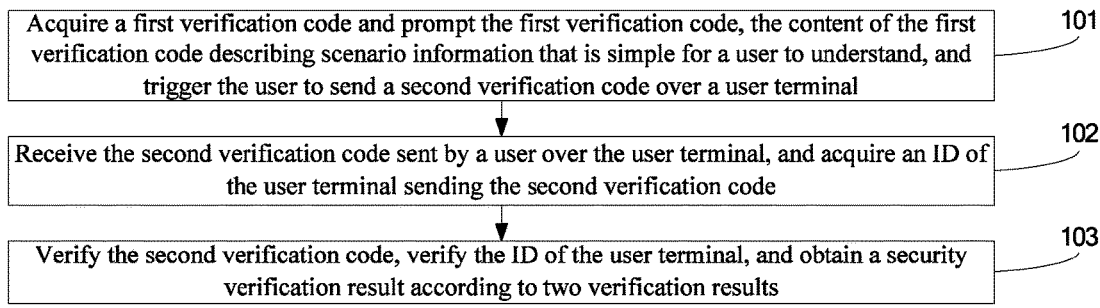
FIG. 1 is a flowchart of a security verification method according to an embodiment of the present disclosure.

An embodiment of the present disclosure provides a security verification method. Referring to FIG. 1, the method according to this embodiment includes the following steps:

Step 101: A first verification code is acquired and prompted, the content of the first verification code describing scenario information that is simple for a user to understand, and the user is triggered to send a second verification code over a user terminal.

Preferably, prior to the acquiring a first verification code, the method further includes:

acquiring current verification scenario information, the verification scenario information at least containing information about the type of a service described by a verification scenario;

where the acquiring a first verification code includes:

searching, among the pre-stored verification codes, according to a preset mapping relationship between verification scenario information and verification codes, a verification code corresponding to the current verification scenario information, and using the searched verification code as the acquired first verification code.

Optionally, prior to the acquiring a first verification code, the method further includes:

acquiring current verification scenario information, the verification scenario information at least containing information about the type of a service described by a verification scenario;

where the acquiring a first verification code includes:

sending the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information; and receiving the verification code returned by the verification apparatus, and using the received verification code as the acquired first verification code.

Step 102: The second verification code sent by the user over the user terminal is received, and an ID of the user terminal sending the second verification code is acquired.

Step 103: The second verification code and the ID of the user terminal are verified, and a security verification result is obtained according to two verification results.

Preferably, different verification codes are corresponding to different permissions; and after the acquiring a security verification result according to two verification results, the method further includes:

granting a permission corresponding to the second verification code when the verification of the second verification code is successful and the verification of the ID of the user terminal is successful.

Preferably, the verifying the second verification code includes:

judging whether the second verification code is identical to the first verification code;

indicating that the verification of the second verification code is successful if the second verification code is identical to the first verification code; and indicating that the verification of the second verification code is failed if the second verification code is not identical to the first verification code.

Optionally, the verifying the second verification code includes:

sending the second verification code to a verification apparatus where verification codes are pre-stored, such that the verification apparatus judges whether the second verification code is among the verification codes pre-stored in the verification apparatus and returns a first judgment result; and receiving the first judgment result returned by the verification apparatus, and obtaining a verification result to the second verification code according to the first judgment result.

Preferably, prior to the verifying the ID of the user terminal, the method further includes:

acquiring a user name and password currently input by a user;

where the verifying the ID of the user terminal includes:

judging whether the ID of the user terminal is among the pre-stored IDs;

indicating that the verification of the ID of the user terminal is failed if the ID of the user terminal is not among the pre-stored IDs; and judging whether the acquired user name and password are consistent with the pre-stored user name and password corresponding to the ID of the user terminal if the ID of the user terminal is among the pre-stored IDs; indicating that the verification of the ID of the user terminal is successful if the acquired user name and password are consistent with the pre-stored user name and password corresponding to the ID of the user terminal; and indicating that the verification of the ID of the user terminal is failed if the acquired user name and password are inconsistent with the pre-stored user name and password corresponding to the ID of the user terminal.

Optionally, prior to the verifying the ID of the user terminal, the method further includes:

acquiring a user name and password currently input by a user;

where the verifying the ID of the user terminal includes:

sending the acquired user name and password as well as the ID of the user terminal to a verification apparatus, such that the verification apparatus judges whether the ID of the user terminal and the user name and password are pre-stored in the verification apparatus, and returns a second judgment result; and receiving the second judgment result returned by the verification apparatus, and obtaining a verification result to the ID of the user terminal according to the second judgment result.

With the method according to this embodiment, a first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced.

To state the security verification method according to the above embodiment more clearly, in combination with the content of the above embodiment, using the following embodiment as an example, a security verification method is described in detail as follows in the following embodiment.

An embodiment of the present disclosure provides a security verification method. In combination with the embodiment illustrated in FIG. 1, referring to FIG. 2, the method according to this embodiment includes the following steps:

Step 201: A first verification code is acquired, the content of the first verification code describing scenario information that is simple for a user to understand, and the user is triggered to send a second verification code over a user terminal.

As Chinese scenario information herein is simpler for a user to understand and memorize relative to a meaningless random verification string, the first verification code is illustrated in a form of Chinese verification information describing the scenario information. It is convenient for a user to understand the scenario information corresponding to the current first verification code and then determine whether to send a verification code over a terminal according to the understood scenario information. It is also simple for the user to input the first verification code. In addition, the first verification code may be presented in other forms. The specific form of the first verification code is not limited in this embodiment.

Moreover, the first verification code is used for triggering the user to send a second verification code over a user terminal. If the second verification code is identical to the first verification code, the second verification code is verified in the subsequent step, and a permission granted for the user is identical to that corresponding to the first verification code when it is determined to grant the permission corresponding to the second verification code for the user. If the second verification code is not identical to the first verification code, the second verification code is verified in the subsequent step, and a permission granted for the user is not identical to that corresponding to the first verification code when it is determined to grant the permission corresponding to the second verification code for the user.

In addition, different verification codes are corresponding to different permissions, where the verification code is the first verification code or the second verification code. If the verification code is "删除 (delete)", it is corresponding to a delete permission; and if the verification code is "支付 (payment)", it is corresponding to a payment permission. Besides, the verification code may be other content, and the permission corresponding to any content of the verification code may be other permissions. The specific content of a verification code and the specific permission corresponding to any content of the verification code are not limited in this embodiment.

In addition, the specific time for acquiring a first verification code is not limited in this embodiment. For example, the first verification code may be acquired when a user opens a web page requiring security verification, or when the user opens a web page requiring security verification and clicks a link for acquiring the first verification code, or when the user opens a web page requiring security verification and clicks a control for acquiring the first verification code.

In addition, the specific way of acquiring a first verification code is also not limited in this embodiment, including but is not limited to: acquiring a first verification code by any one of the following two ways if a mapping relationship between verification scenario information and verification codes is preset and stored before acquiring the first verification code.

The first way of acquiring a first verification code is as follows: directly acquiring current verification scenario information; searching, among the pre-stored verification codes, according to the preset mapping relationship between verification scenario information and verification codes, a verification code corresponding to the current verification scenario information, and using the searched verification code as the acquired first verification code.

With regard to the first way of acquiring a first verification code, the specific method for acquiring the current verification scenario information is not limited in this embodiment. For example, the information about a current page is acquired directly and then the acquired information about the current page is used as the current verification scenario information.

Description is given using the mapping relationship between verification scenario information and verification codes pre-stored in a front-end apparatus being illustrated in Table 1 as an example.

TABLE 1

| Verification scenario information | Verification code |
|---|---|
| Deletion scenario information | 删除 (delete) |
| Payment scenario information | 支付 (payment) |

If the directly acquired information about the current page is information about a payment page, the information about the payment page is used as verification scenario information; then, a verification code "支付 (payment)" corresponding to the information about the payment page is searched from the pre-stored verification codes according to the mapping relationship illustrated in Table 1 of the verification scenario information and verification codes pre-stored in the front-end apparatus; and the searched "支付 (payment)" is used as the acquired first verification code.

The second way of acquiring a first verification code is as follows: acquiring current verification scenario information; sending the current verification scenario information to a verification apparatus where verification scenario information and verification codes are pre-stored, such that the verification apparatus searches and returns, among the pre-stored verification codes, a verification code corresponding to the current verification scenario information according to a preset mapping relationship between verification scenario information and verification codes; and receiving the verification code returned by the verification apparatus, and using the received verification code as the acquired first verification code.

With regard to the second way of acquiring a first verification code, by using the subject for executing the method according to this embodiment being a front-end apparatus and the verification apparatus where verification scenario information and verification codes are pre-stored being a rear-end apparatus as an example, the specific implementation may be achieved by the following sub-steps:

Sub-step 1: Current verification scenario information is acquired and then sent to a rear-end apparatus.

In sub-step 1 in step 201, the specific method for acquiring the current verification scenario information is not limited in this embodiment. For example, the information about a current page is acquired directly and then the acquired information about the current page is used as the current verification scenario information.

Moreover, the specific way for the front-end apparatus to send the current verification scenario information to the rear-end apparatus is also not limited in this embodiment, including but is not limited to: the front-end apparatus carries the current verification scenario information in a signaling message to be sent to the rear-end apparatus in order to send the current verification scenario information to the rear-end apparatus or directly sends the current verification scenario information to the rear-end apparatus.

Sub-step 2: The rear-end apparatus receives the current verification scenario information sent by the front-end apparatus, searches, from the pre-stored verification codes, verification code corresponding to the current verification scenario information according to a preset mapping relationship between verification scenario information and verification codes, and returns the verification code to the front-end apparatus.

In sub-step 2 in step 201, the specific way for the rear-end apparatus to receive the current verification scenario information sent by the front-end apparatus is not limited in this embodiment, including but is not limited to: the rear-end apparatus receives a message containing the current verification scenario information sent by the front-end apparatus, and parses the received message to acquire the current verification scenario information. The specific way of returning the searched verification code to the front-end apparatus is also not limited in this embodiment, including but is not limited to: the rear-end apparatus carries the searched verification code in a signaling message to be sent to the front-end apparatus, to send the searched verification code to the front-end apparatus.

Using the current verification scenario information received by the rear-end apparatus and sent by the front-end apparatus being information about a payment page, and the mapping relationship between verification scenario information and verification codes stored in the rear-end apparatus being illustrated in Table 1 as an example, the rear-end apparatus searches, among the pre-stored verification codes, the verification code "支付 (payment)" corresponding to the information about the payment page according to the mapping relationship illustrated as Table 1 of the verification scenario information and verification codes stored in the rear-end apparatus, and carries the searched "支付 (payment)" in a signaling message to be sent to the front-end apparatus in order to send the searched "支付 (payment)" to the front-end apparatus.

Sub-step 3: The front-end apparatus receives the verification code returned by the rear-end apparatus, and uses the received verification code as the acquired first verification code.

In sub-step 3 in step 201, the specific way for the front-end apparatus to receive the verification code returned by the rear-end apparatus is not limited in this embodiment, including but is not limited to: the front-end apparatus receives a message containing the verification code sent by the rear-end apparatus and parses the received massage to acquire the verification code.

Using the verification code received by the front-end apparatus and returned by the rear-end apparatus being "支付 (payment)" as an example, the received "支付 (payment)" is used as the acquired first verification code.

In addition, the standards of selecting the first way of acquiring a first verification code or the second way of acquiring a first verification code to acquire the first verification code are not limited in this embodiment. The selection standards include, but are not limited to: if the apparatus, where a preset mapping relationship between verification scenario information and verification codes is stored, is a front-end apparatus that acquires and displays the first verification code, the first way of acquiring a first verification code is selected to acquire the first verification code; and if the apparatus, where a preset mapping relationship between verification scenario information and verification codes is stored, is another apparatus, the second way of acquiring a first verification code is selected to acquire the first verification code.

It should be noted that, in the method according to this embodiment, the first verification code is set and pre-stored before any security verification is performed. The specific method for setting the first verification code is not limited in this embodiment, including but is not limited to: setting the first verification code according to the type of a service described by the verification scenario information, and storing a set mapping relationship between the verification scenario information and verification codes.

Using the verification scenario information being information about a payment scenario as an example, the first verification code is set as "支付 (payment)" according to a payment service contained in the information about the payment scenario, and the set mapping relationship between the information about the payment scenario and "支付 (payment)" is stored. Nevertheless, in addition to characters, the first verification code may also be digits, letters, or other symbols, or any combination of characters, digits, letters and other symbols. The specific form of the first verification code is not limited in this embodiment.

The specific form of a verification scenario is not limited in this embodiment. For example, as the information displayed on a page acquiring security verification may describe the type of a service provided for a user by this page, for instance, the information displayed on a payment page acquiring security verification describes that the type of a service provided for a user by this page is a payment service, a page acquiring security verification may be used as a verification scenario. Meanwhile, the information on the page acquiring security verification is used as verification scenario information. The verification scenario information may at least contain information about the type of a service described by the verification scenario. Nevertheless, in addition to the information about the type of a service described by the verification scenario, the verification scenario information may further contain other information. The specific content of the verification scenario information is not limited in this embodiment.

In addition, to reduce the time for acquiring the first verification code, the set mapping relationship between the information about verification codes and verification codes is stored using a dynamic tree structure. In addition to the dynamic tree structure, other storage ways may be used. The specific way of storing the set mapping relationship between the information about verification codes and verification codes is not limited in this embodiment.

Step 202: The first verification code is prompted.

During the specific implementation of this step, the first verification code may be prompted as follows: displaying the first verification code by characters. Using the first verification code being "支付 (payment)" as an example, the first verification code "支付 (payment)" may describe scenario information that is simple for a user to understand. For example, the first verification code "支付 (payment)" helps a user to understand that the current scenario is a payment scenario. In addition to the separate display of the first verification code, Chinese scenario information containing the first verification code may also be displayed within a fixed display region, for example: 您正在进行支付操作，请使用您注册时 注册的手机号发送，"支付" 到XXX (you are performing a operation of payment, please send text "payment" to XXX using your registered phone number). In addition to the above way of displaying the first verification code, the first verification code may be displayed in other ways. The specific way of displaying the first verification code is not limited in this embodiment.

In addition, the first verification code may also be prompted by voice. The specific way of prompting the first verification code is not limited in this embodiment.

For example, the first verification code is prompted by voice containing the first verification code, for example: 您正在进行支付操作，请使用您注册时注册的手机号发送"支付" 到 XXX (you are performing a operation of payment, please send text "payment" to XXX using your registered phone number). In addition to the above way of prompting the first verification code, the first verification code may be prompted in other ways. The specific way of prompting the first verification code by voice is not limited in this embodiment.

In addition, since the content of the first verification code describes the scenario information that is simple for a user to understand, after the first verification code is displayed, the user confirms a permission corresponding to the first verification code according to the scenario information described in the first verification code, and judges whether the permission corresponding to the first verification code is identical to a permission required by the user. If the permission corresponding to the first verification code is identical to a permission required by the user, the user sends a verification code over a designated user terminal according to the displayed first verification code; and if the permission corresponding to the first verification code is not identical to a permission required by the user, the user does not send a verification code over the designated user terminal according to the displayed first verification code in order to prevent unauthorized users from stealing the verification code using similar websites. The verification code sent by the user should be identical to the displayed first verification code. However, it is possible that the verification code sent by the user is not identical to the displayed first verification code due to the fault of the user or other causes. Regardless of whether the verification code sent by the user is or not identical to the displayed first verification code, the verification code sent by the user is uniformly referred to a second verification code in this embodiment.

Using the way of prompting the first verification code being displaying the first verification code as an example, if what is displayed in the front device is: 您正在进行支付操作，请使用您注 册时注册的手机号发送"支付" 到XXX (you are performing a operation of payment, please send text "payment" to XXX using your registered phone number), the user sends "支付 (payment)" to XXX using the mobile phone number used during the registration. Alternatively, the user may send "制服 (phrase with pronunciation similar to payment)" to XXX using the mobile phone number used during the registration due to the misoperation of the user or some specific causes. Nevertheless, the content sent by the user using the mobile phone number used during the registration may also be other content, and is not limited in this embodiment.

Step 203: The second verification code sent by the user over the user terminal is received, and an ID of the user terminal sending the second verification code is acquired.

In this step, the specific way of receiving a second verification code sent by the user over the user terminal and acquiring an ID of the user terminal sending the second verification code is not limited in this embodiment, including but is not limited to: if the user sends a second verification code in a way of sending a short message containing the verification code using a mobile phone, the short message containing the second verification code sent by the user is received, and the received short message is parsed to obtain the second verification code. Meanwhile, the number of the mobile phone sending the second verification code is used as the ID of the user terminal sending the second verification code.

In addition, since the user sends the second verification code according to the first verification code displayed in the front-end apparatus, the received second verification code sent by the user over the user terminal should be identical to the first verification code displayed in the front-end apparatus. However, some specific causes, for example, the misoperation of the user, may result in that the second verification code is not identical to the first verification code. Therefore, verification is performed to determine whether the second verification is correct in the subsequent steps after the second verification code is received.

It should be noted that, if the user terminal sending the second verification code has a plurality of IDs, the acquired ID of the user terminal sending the second verification code is used as the ID by which the second verification code is sent. For example, if the second verification code is sent in a form of a short message using a mobile phone and the mobile phone sending the second verification code is a dual-card mobile phone. That is, the mobile phone sending the second verification code has two mobile phone numbers: mobile phone number 1 and mobile phone number 2, respectively, and the user sends the second verification code by the mobile phone number 2, the acquired ID of the user terminal sending the second verification code is the mobile phone number by which the short message is sent, i.e., mobile phone number 2.

In addition, after step 203, step 204 and subsequent steps are performed to verify the received second verification code and the ID of the user terminal sending the second verification code in step 203. Alternatively, after step 203 is performed and the user clicks a control for verification in an interface displayed in the front-end apparatus, step 204 and subsequent steps are performed to verify the received second verification code and the ID of the user terminal sending the second verification code in step 203. The specific time for performing step 204 and subsequent steps upon step 203 to verify the received second verification code and the ID of the user terminal sending the second verification code in step 203 is not limited in this embodiment.

Step 204: The second verification code is verified to obtain a verification result to the second verification code.

In this step, the specific method for verifying the second verification code is not limited in this embodiment, including but is not limited to: verifying the second verification code by any one of the following two verification methods.

The first method for verifying the second verification code is as follows: judging whether the second verification code is identical to the first verification code, indicating that the verification of the second verification code is successful if the second verification code is identical to the first verification code, and indicating that the verification of the second verification code is failed if the second verification code is not identical to the first verification code.

With regard to the first method for verifying the second verification code, since the front-end apparatus has acquired the first verification code in step 201 and has received the second verification code in step 203, the front-end apparatus may directly judge whether the second verification code is identical to the first verification code.

The second method for verifying the second verification code is as follows: the front-end apparatus sends the second verification code to a verification apparatus where verification codes are pre-stored, such that the verification apparatus judges whether the second verification code is among the verification codes pre-stored in the verification apparatus and returns a first judgment result; and the front-end apparatus receives the first judgment result returned by the verification apparatus, and obtains a verification result to the second verification code according to the first judgment result.

With regard to the second method for verifying the second verification code, taking the subject of executing the method provided in this embodiment is a front-end apparatus and the verification apparatus where verification codes are pre-stored being a rear-end apparatus as an example, the specific implementation may be achieved by the following sub-steps.

Sub-step 1: The second verification code is sent to the rear-end apparatus.

In sub-step 1 in step 204, the specific way for the front-end apparatus to send the second verification code to the rear-end apparatus is not limited in this embodiment, including but is not limited to: the front-end apparatus carries the second verification code in a signaling message to be sent to the rear-end apparatus in order to send the second verification code to the rear-end apparatus or directly sends the second verification code to the rear-end apparatus.

Sub-step 2: The rear-end apparatus receives the second verification code sent by the front-end apparatus, judges whether the second verification code is among the verification codes pre-stored in the rear-end apparatus, and returns the first judgment result to the front-end apparatus.

In sub-step 2 in step 204, as verification codes are pre-stored in the rear-end apparatus, and the first verification code is searched from the stored verification codes according to the verification scenario information, the first verification code is among the pre-stored verification codes. Judging whether the second verification code is among the verification codes pre-stored in the rear-end apparatus may implement the step of judging whether the second verification code is identical to the first verification code. Upon receiving the second verification code, the rear-end apparatus searches whether a verification code identical to the second verification code is among the pre-stored verification codes. If there is a verification code identical to the second verification code, the first judgment result indicates that there is a verification code; and if there is no verification code identical to the second verification code, the first judgment result indicates that there is no verification code and then the first judgment result is returned.

The specific way for the rear-end apparatus to receive the second verification code sent by the front-end apparatus is not limited in this embodiment, including but is not limited to: the rear-end apparatus receives a message containing the second verification code sent by the front-end apparatus, and parses the received message to acquire the second verification code. The specific way of returning the first judgment result to the front-end apparatus is also not limited in this embodiment, including but is not limited to: the rear-end apparatus carries the first judgment result in a signaling message to be sent to the front-end apparatus in order to send the first judgment result to the front-end apparatus.

Sub-step 3: The front-end apparatus receives the first judgment result returned by the rear-end apparatus, and obtains a verification result to the second verification code according to the first judgment result.

In sub-step 3 in step 204, if the first judgment result received by the front-end apparatus indicates that there is a verification code, the verification of the second verification code is successful. If the first judgment result received by the front-end apparatus indicates that there is no verification code, the verification of the second verification code is failed. The specific way for the front-end apparatus to return the first judgment result to the rear-end apparatus is not limited in this embodiment, including but is not limited to:

the front-end apparatus receives a message containing the first judgment result sent by the rear-end apparatus, and parses the received message to acquire the first judgment result.

In addition, the standards of selecting the first method for verifying the second verification code or the second method for verifying the second verification code to verify the second verification code is not limited in this embodiment. The selection standards include, but are not limited to:

if the apparatus, where a preset mapping relationship between verification scenario information and verification codes is stored, is determined to be a front-end apparatus in step 204, the first method for verifying the second verification code is selected to perform verification of the second verification code; and if the apparatus, where a preset mapping relationship between verification scenario information and verification codes is stored, is another apparatus, the first method for verifying the second verification method or the second method for verifying the second verification code may be selected randomly to verify the second verification code.

It should be noted that, since different user terminals may be different with respect to the coding of Chinese characters, during the verification of the second verification code, coding conversion is performed to the received second verification code at first in order to convert the second verification code into a uniformly-coded second verification, and then the converted second verification code is verified. Meanwhile, to avoid errors, such as incorrect characters, in the second verification code due to the own causes of the user, a fuzzy matching verification method is used during the verification of the second verification code. Of course, other methods may be used as the specific method for verifying the second verification code. The specific method for verifying the second verification code is not limited in this embodiment.

Step 205: The ID of the user terminal is verified to obtain a verification result to the ID of the user terminal.

During the specific implementation of this step, the specific method for verifying the ID of the user terminal is not limited in this embodiment, including but is not limited to: selecting any one of the following two verification methods to perform verification of the ID of the user terminal.

The first method for verifying the ID of the user terminal is as follows: directly verifying the ID of the user terminal.

With regard to the first method for verifying the ID of the user terminal, the specific implementation may be achieved by the following four steps.

Sub-step 1: A user name and password currently input by a user are acquired.

In sub-step 1, the specific way of acquiring a user name and password currently input by a user is not limited in this embodiment. If the user has been logged in, the user name and password input by the user for login are used as the user name and password currently input by the user; and if the user has not been logged in, a window is popped up to require the current user to input a user name and password, and the user name and password input in the window by the user are used as the user name and password currently input by the user.

Sub-step 2: It is judged whether there is the ID of the user terminal among pre-stored IDs; if there is no ID of the user terminal among pre-stored IDs, the process proceeds to sub-step 3; and if there is the ID of the user terminal among pre-stored IDs, the process proceeds to sub-step 4.

In sub-step 2, since the user also registers the ID of a user terminal sending the second verification code in addition to the user name and password during pre-registration, for example, a mobile phone number for sending the second verification code, an ID corresponding to the user name and password is also stored in the front-end apparatus in addition to the user name and password. Therefore, it is judged whether there is the ID of the user terminal among pre-stored IDs to determine whether the ID of the user terminal has been registered.

Sub-step 3: It is indicated that the verification of the ID of the user terminal is failed.

Sub-step 4: It is judged whether the acquired user name and password are consistent with the pre-stored user name and password corresponding to the ID of the user terminal; the verification of the ID of the user terminal is successful if the acquired user name and password are consistent with the pre-stored user name and password corresponding to the ID of the user terminal; and the verification of the ID of the user terminal is failed if the acquired user name and password are inconsistent with the pre-stored user name and password corresponding to the ID of the user terminal.

In sub-step 4, since the front-end apparatus is stored with the user name and password as well as the corresponding IDs, and there is an ID of the user terminal among the IDs stored, the user name and password corresponding to the ID of the user terminal may be found from the pre-stored user names and passwords as well as the corresponding IDs. Meanwhile, the verification result of the ID of the user terminal is determined according to whether the acquired user name and password are consistent with the pre-stored user name and password corresponding to the ID of the user terminal.

It should be noted that, the direct verification of the ID of the user terminal may also be implemented by other methods other than the above method. The specific method for directly verifying the ID of the user terminal is not limited in this embodiment.

The second method for verifying the ID of the user terminal is as follows: verifying the ID of the user terminal using a verification apparatus.

With regard to the second method for verifying the ID of the user terminal, taking the subject of executing the method provided in this embodiment being a front-end apparatus and the verification apparatus being a rear-end apparatus as an example, the specific implementation may be achieved by the following sub-steps.

Sub-step 1: The front-end apparatus acquires a user name and password currently input by a user, and sends the acquired user name and password as well as an ID of a user terminal to the rear-end apparatus.

In sub-step 1 in step 205, the specific way for the front-end apparatus to send the acquired user name and password as well as an ID of a user terminal to the rear-end apparatus is not limited in this embodiment, including but is not limited to: the front-end apparatus carries the acquired user name and password as well as the ID of the user terminal in a signaling message to be sent to the rear-end apparatus in order to send the acquired user name and password as well as the ID of the user terminal to the rear-end apparatus or directly sends the acquired user name and password as well as the ID of the user terminal to the rear-end apparatus.

Sub-step 2: The rear-end apparatus receives the user name and password as well as the ID of the user terminal sent by the front-end apparatus, judges whether the ID of the user terminal, the user name and password can be found in the verification apparatus, and then returns a second judgment result to the front-end apparatus.

In sub-step 2 in step 205, since the rear-end apparatus is stored with the ID of the registered user terminal, the user name and password during the registration of the user, it is judged whether the ID of the user terminal is among the pre-stored IDs, in order to determine whether the ID of the user terminal has been registered. If the ID of the user terminal is not among the pre-stored IDs, the second judgment result indicates the ID of the user terminal does not exist. If the ID of the user terminal is among the pre-stored IDs, it is judged whether the acquired user name and password are consistent with the pre-stored user name and password corresponding to the ID of the user terminal. The second judgment result indicates the ID of the user terminal exists if the acquired user name and password are consistent with the pre-stored user name and password corresponding to the ID of the user terminal; and the second judgment result indicates the ID of the user terminal does not exist if the acquired user name and password are inconsistent with the pre-stored user name and password corresponding to the ID of the user terminal.

The specific way for the rear-end apparatus to receive the user name and password as well as the ID of the user terminal sent by the front-end apparatus is not limited in this embodiment, including but is not limited to: the rear-end apparatus receives a message containing the user name and password as well as the ID of the user terminal sent by the front-end apparatus, and parses the received message to acquire the user name and password as well as the ID of the user terminal. The specific way of returning the second judgment result to the front-end apparatus is not limited in this embodiment, including but is not limited to: the rear-end apparatus carries the second judgment result in a signaling message to be sent to the front-end apparatus in order to send the second judgment result to the front-end apparatus.

Sub-step 3: The front-end apparatus receives the second judgment result returned by the rear-end apparatus, and obtains a verification result to the ID of the user terminal according to the second judgment result.

In sub-step 3 in step 205, if the second judgment result received by the front-end apparatus indicates that the ID of the user terminal exists, the verification of the ID corresponding to the user terminal is successful. If the second judgment result received by the front-end apparatus indicates that the ID of the user terminal does not exist, the verification of the ID of the user terminal is failed. The specific way for the front-end apparatus to return the second judgment result to the rear-end apparatus is not limited in this embodiment, including but is not limited to: the front-end apparatus receives a message containing the second judgment result sent by the rear-end apparatus, and parses the received message to acquire the second judgment result.

It should be noted that, the verification of the ID of the user terminal using a verification apparatus may also be implemented by other methods other than the above method. The specific method for verifying the ID of the user terminal using a verification apparatus is not limited in this embodiment.

In addition, the standards of selecting the first method for verifying the ID of the user terminal or the second method for verifying the ID of the user terminal to perform verification of the ID of the user terminal is not limited in this embodiment. The selection standards include, but are not limited to: selecting the first method for verifying the ID of the user terminal or the second method for verifying the ID of the user terminal randomly to verify the ID of the user terminal.

Step 206: A result of security verification is obtained according to the verification result of the second verification code and the verification result of the ID of the user terminal.

In this step, if the result of verification obtained in step 204 indicates that the verification of the second verification code is successful, and the result of verification obtained in step 205 indicates that the verification of the ID of the user terminal is also successful, the result of security verification indicates that it is secure. If the result of verification obtained in step 204 indicates that the verification of the second verification code is failed, or the result of verification obtained in step 205 indicates that the verification of the ID of the user terminal is failed, the result of security verification indicates that it is not secure.

In addition, since different verification codes are corresponding to different permissions, the verification code being the first verification code or the second verification code, after the result of security verification is obtained according to the verification result of the second verification code and the verification result of the ID of the user terminal, the permission corresponding to the second verification code is granted. The specific process of granting the permission corresponding to the second verification code according to the result of security verification obtained according to the verification result of the second verification code and the verification result of the ID of the user terminal is not limited in this embodiment, including but is not limited to the following processes:

when the verification of the second verification code is successful, and the verification of the ID of the user terminal is successful, the permission corresponding to the second verification code is granted; and when the verification of the verification code is failed or the verification of the ID of the user terminal is failed, any permission is not granted.

It should be noted that, during the specific implementation of this embodiment, if the first verification code acquired according to the mapping relationship as illustrated in Table 1 of the verification scenario information and verification codes in step 201 is "支付 (payment)", while the received second verification code sent by the user in step 203 is "删除 (delete)", the result of verification obtained in step 204 indicates the verification of the second verification code is successful as the verification code "删除 (delete)" has been stored in Table 1. If the result of verification obtained in step 205 indicates that the verification of the ID of the user terminal is also successful, the result of security verification obtained in step 206 indicates that it is secure. However, practically the result of security verification should indicate that it is not secure. To avoid accessing services after passing the security verification, due to incorrect result of security verification caused when the second verification code is not identical to the first verification code but the second verification code exists among the pre-stored verification codes, the front-end apparatus grants the permission of a service of a type corresponding to the second verification code for the current user according to the second verification code after the security verification. Still using the above case as an example, although the result of security verification indicates that it is secure, the front-end apparatus grants the delete permission corresponding to "删除 (delete)" rather than the payment permission corresponding to "支付 (payment)" after successful verification. Therefore, even if an incorrect result of security verification is caused when the second verification code is not identical to the first verification code but the second verification code exists among the pre-stored verification codes, the current user is not granted with the permission of a service provided in the current verification scenario, thereby avoiding the risk that an unauthorized user sends a second verification code arbitrarily and passes the security verification by luck and then acquires the permission of a service provided in the current scenario to access the service.

In addition, there may be two structures of implementation environment involved in the security verification method provided by this embodiment of the present disclosure. According to different verification apparatus where verification scenario information and verification codes are stored, the structure of implementation environment involved in the security verification method is correspondingly different. If the verification device where verification scenario information and verification codes are stored is a front-end apparatus, the corresponding structure of implementation environment involved in the security verification method is illustrated as the following first structure of implementation environment; and if the verification device where verification scenario information and verification codes are stored is another apparatus, the corresponding structure of implementation environment involved in the security verification method is illustrated as the following second structure of implementation environment.

Figure 3:
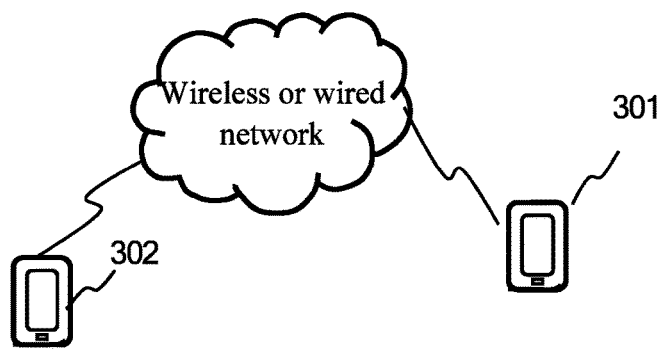
FIG. 3 is a schematic structural diagram of an implementation environment involved in the security verification method according to an embodiment of the present disclosure.

The first structure of implementation environment: as illustrated in FIG. 3, the implementation environment involves a front-end apparatus 301 for performing security verification and a user terminal 302 for sending a second verification code.

A security verification apparatus runs in the front-end apparatus 301 for performing security verification. The security verification apparatus is the security verification apparatus as illustrated in the embodiment illustrated in FIG. 3. In addition, the front-end apparatus 301 for performing security verification may be a smartphone, a flat computer, a portable laptop computer, a desk computer, etc.

The user terminal 302 for sending a second verification code may be a user terminal registered during the registration for sending a second verification code, or other user terminals.

The front-end apparatus 301 for performing security verification and the user terminal 302 may be communicated with each other over a wireless network.

Figure 4:
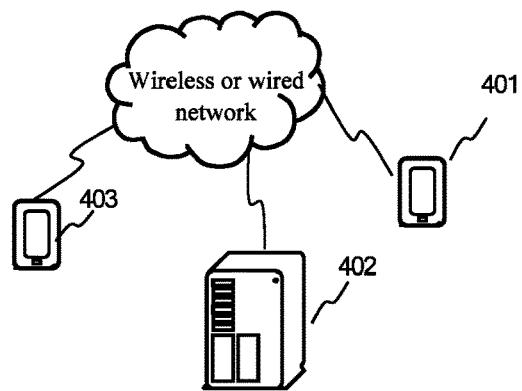
FIG. 4 is a schematic structural diagram of another implementation environment involved in the security verification method according to an embodiment of the present disclosure.

The second structure of implementation environment: as illustrated in FIG. 4, the implementation environment involves a front-end apparatus 401 for performing security verification, a verification apparatus 402 for pre-storing verification scenario information and verification codes and a user terminal 403 for sending a second verification code.

A security verification apparatus runs in the front-end apparatus 401 for performing security verification. The security verification apparatus is the security verification apparatus as illustrated in the embodiment illustrated in FIG. 3. In addition, the front-end apparatus 401 for performing security verification may be a smartphone, a flat computer, a portable laptop computer, a desk computer, etc.

The verification apparatus 402 for pre-storing verification scenario information and verification codes may be a rear-end server, which is configured to provide a service of security verification for a user together with the front-end apparatus 401 for performing security verification.

The user terminal 402 for sending a second verification code may be a user terminal registered during the registration for sending a second verification code, or other user terminals.

The front-end apparatus 401 for performing security verification, the verification apparatus 402 for pre-storing verification scenario information and verification codes and the user terminal 403 for sending a second verification code may communicate with each other over a wireless or wired network.

According to the method provided in this embodiment, a first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced. Meanwhile, after the security verification, the permission of a service of a type corresponding to the second verification code is granted for the current user according to the second verification code, such that the function of granting different permissions according to different scenarios is implemented, and the risk of acquiring permissions of all scenarios once stealing one verification code further to access services provided by all scenarios is avoided.

Figure 5:
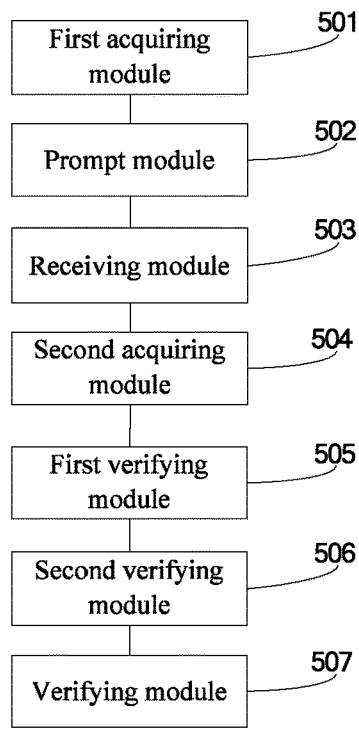
FIG. 5 is a schematic structural diagram of a first security verification apparatus according to an embodiment of the present disclosure.

An embodiment of the present disclosure provides a security verification apparatus, configured to execute the security verification method provided in the above embodiments. Referring to FIG. 5, the device includes:

a first acquiring module 501, configured to acquire a first verification code;

a prompt module 502, configured to: prompt the first verification code acquired by the first acquiring module 501, the content of the first verification code describing scenario information that is simple for a user to understand; and trigger the user to send a second verification code over a user terminal;

a receiving module 503, configured to receive the second verification code sent by the user over the user terminal;

a second acquiring module 504, configured to acquire an ID of a user terminal sending the second verification code;

a first verifying module 505, configured to perform verification of the second verification code;

a second verifying module 506, configured to perform verification of the ID of the user terminal; and a verifying module 507, configured to obtain a security verification result according to two verification results obtained by the first verifying module and the second verifying module.

Figure 6:
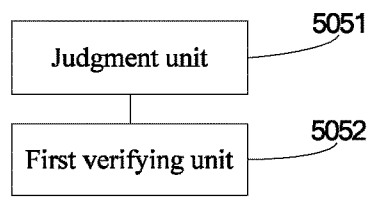
FIG. 6 is a schematic structural diagram of a first verifying module according to an embodiment of the present disclosure.

Referring to FIG. 6, the first verifying module 505 includes:

a judging unit 5051, configured to judge whether the second verification code is identical to the first verification code;

a first verifying unit 5052, configured to indicate that the verification of the second verification code is successful when the second verification code is identical to the first verification code; and indicate that the verification of the second verification code is failed when the second verification code is not identical to the first verification code.

Figure 7:
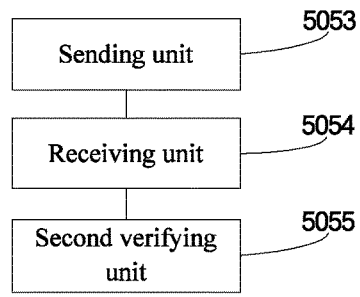
FIG. 7 is a schematic structural diagram of another first verifying module according to an embodiment of the present disclosure.

Optionally, referring to FIG. 7, the first verifying module 505 includes:

a sending unit 5053, configured to send the second verification code to a verification apparatus where verification codes are pre-stored, such that the verification apparatus judges whether the second verification code is among the verification codes pre-stored in the verification apparatus and returns a first judgment result; and a receiving unit 5054, configured to receive the first judgment result returned by the verification apparatus; and a second verifying unit 5055, configured to obtain a verification result to the second verification code according to the first judgment result received by the receiving unit 5054.

Figure 8:
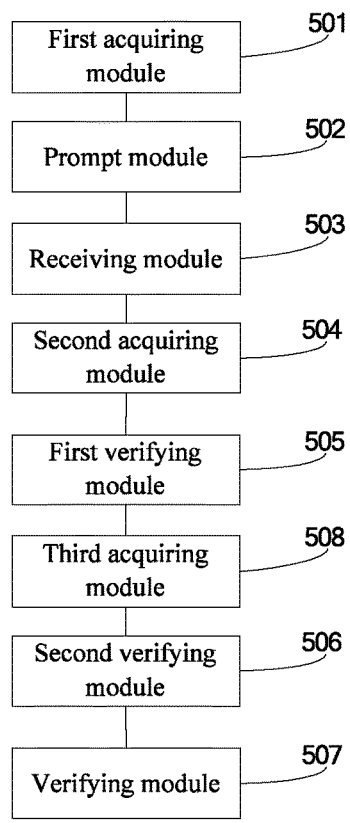
FIG. 8 is a schematic structural diagram of a second security verification apparatus according to an embodiment of the present disclosure.

Referring to FIG. 8, the device further includes:

a third acquiring module 508, configured to acquire a user name and password currently input by a user.

Figure 9:
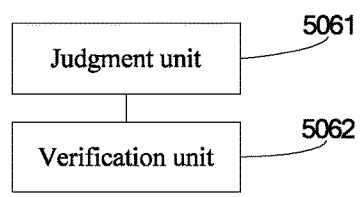
FIG. 9 is a schematic structural diagram of a second verifying module according to an embodiment of the present disclosure.

Referring to FIG. 9, the second verifying module 506 includes:

a judging unit 5061, configured to judge whether the ID of the user terminal is among the pre-stored IDs; and a verifying unit 5062, configured to: indicate that the verification of the ID of the user terminal is failed when the ID of the user terminal is not among the pre-stored IDs; judge whether the acquired user name and password are consistent with the pre-stored user name and password corresponding to the ID of the user terminal when the ID of the user terminal is among the pre-stored IDs; indicate that the verification of the ID of the user terminal is successful if the acquired user name and password are consistent with the pre-stored user name and password corresponding to the ID of the user terminal; and indicate that the verification of the ID of the user terminal is failed if the acquired user name and password are inconsistent with the pre-stored user name and password corresponding to the ID of the user terminal.

Figure 10:
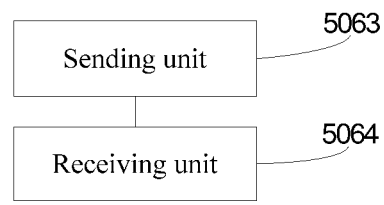
FIG. 10 is a schematic structural diagram of another second verifying module according to an embodiment of the present disclosure.

Optionally, referring to FIG. 10, the second verifying module 506 includes:

a sending unit 5063, configured to send the acquired user name and password as well as the ID of the user terminal to a verification apparatus, such that the verification apparatus judges whether the ID of the user terminal and the user name and password are pre-stored in the verification apparatus, and returns a second judgment result; and a receiving unit 5064, configured to receive the second judgment result returned by the verification apparatus, and obtain a verification result to the ID of the user terminal according to the second judgment result.

Figure 11:
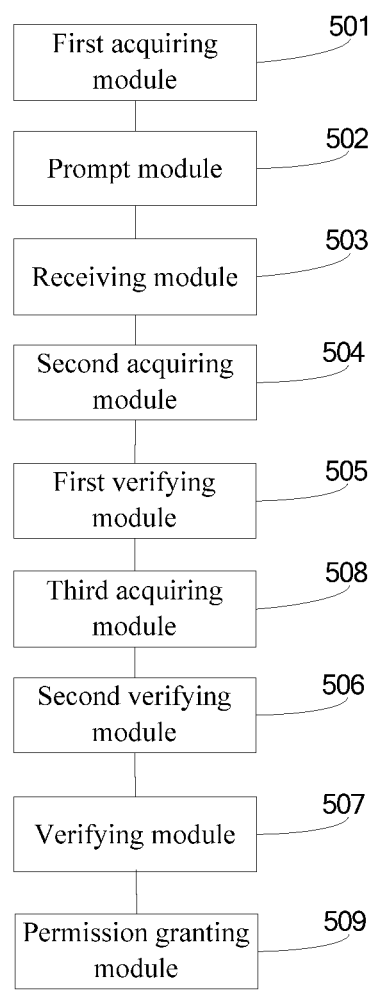
FIG. 11 is a schematic structural diagram of a third security verification apparatus according to an embodiment of the present disclosure.

Preferably, different verification codes are corresponding to different permissions. Referring to FIG. 11, the device includes:

a permission granting module 509, configured to grant a permission corresponding to the second verification code when the first verifying module 505 indicates that the verification of the second verification code is successful and the second verifying module 506 indicates that the verification of the ID of the user terminal is successful.

Figure 12:
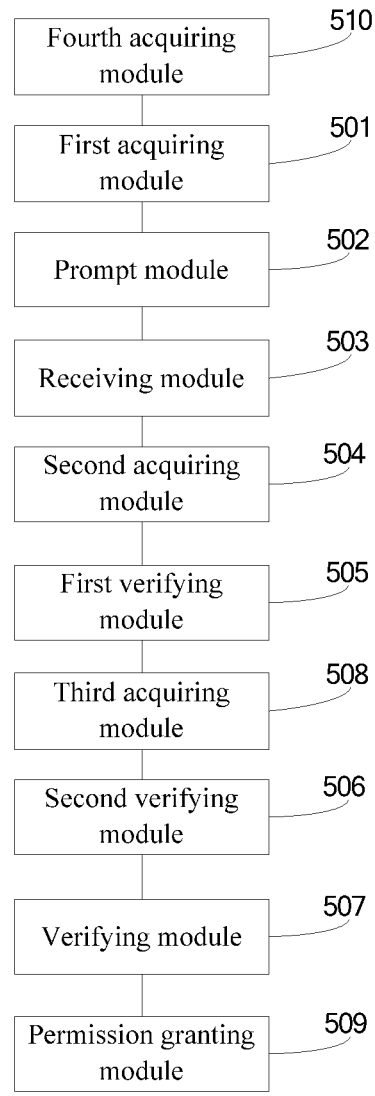
FIG. 12 is a schematic structural diagram of a fourth security verification apparatus according to an embodiment of the present disclosure.

Referring to FIG. 12, the device further includes:

a fourth acquiring module 510, configured to acquire current verification scenario information, the verification scenario information at least containing information about the type of a service described by a verification scenario;

where the first acquiring module 501 is configured to: search, among the pre-stored verification codes, according to a preset mapping relationship between verification scenario information and verification codes, a verification code corresponding to the current verification scenario information; and use the searched verification code as the acquired first verification code.

Figure 13:
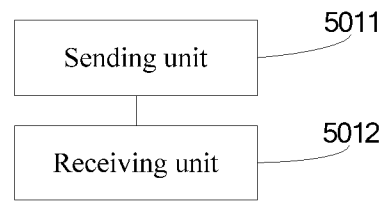
FIG. 13 is a schematic structural diagram of a first acquiring module according to an embodiment of the present disclosure.

Referring to FIG. 13, the first acquiring module 501 includes:

a sending unit 5011, configured to send the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information; and a receiving unit 5012, configured to receive the verification code returned by the verification apparatus, and use the received verification code as the acquired first verification code.

With the terminal provided in this embodiment, a first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced.

Figure 14:
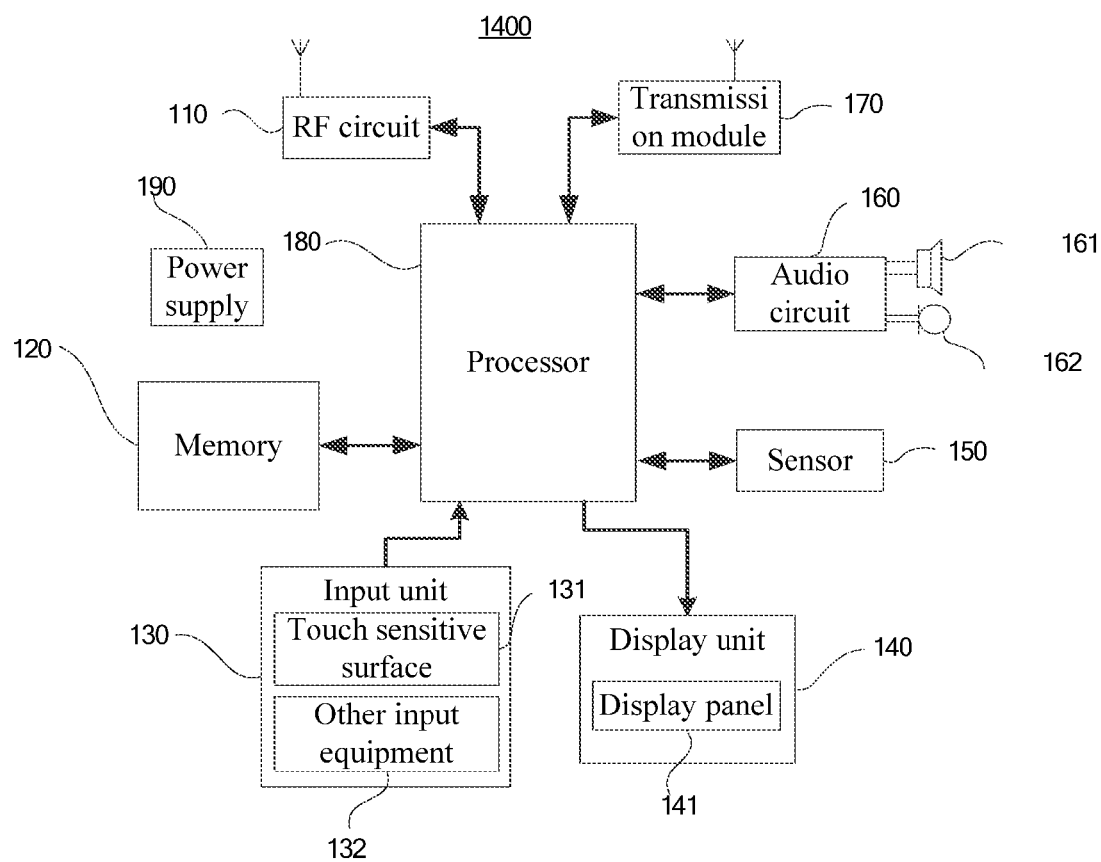
FIG. 14 is a schematic structural diagram of a terminal according to an embodiment of the present disclosure.

Referring to FIG. 14, an embodiment of the present disclosure provides a terminal. FIG. 14 shows a structure diagram of the terminal with a touch sensitive surface involved in the embodiments of the present disclosure. The terminal may be configured to implement the security verification method provided in the above embodiments.

The terminal 1400 may comprise a radio frequency (RF) circuit 110, a memory 120 including one or more computer readable storage media, an input unit 130, a display unit 140, a sensor 150, an audio circuit 160, a transmission module 170, a processor 180 including one or more processing cores, a power supply 190 and the like. A person skilled in the art may understand that the structure of the terminal as illustrated in FIG. 14 does not construe a limitation on the terminal. The terminal may include more components over those illustrated in FIG. 9, or combinations of some components, or employ different component deployments.

The RF circuit 110 may be configured to receive and send signals during information receiving and sending or in the course of a call. Particularly, the RF circuit delivers downlink information received from a base station to at least one processor 180 for processing, and in addition, sends involved uplink data to the base station. Typically, the RF circuit 110 includes, but not limited to: an antenna, at least one amplifier, a tuner, at least one oscillator, a subscriber identity module (SIM) card, a transceiver, a coupler, a low noise amplifier (LNA), a duplexer, and the like. In addition, the RF circuit 110 may also communicate with another network or device using wireless communication. The wireless communication can use any communication standard or protocol, including but not limited to: global system for mobile communications (GSM), general packet radio service (GPRS), code division multiple access (CDMA), wideband code division multiple access (WCDMA), long term evolution (LTE), email, short messaging service (SMS), and the like.

Figure 2:
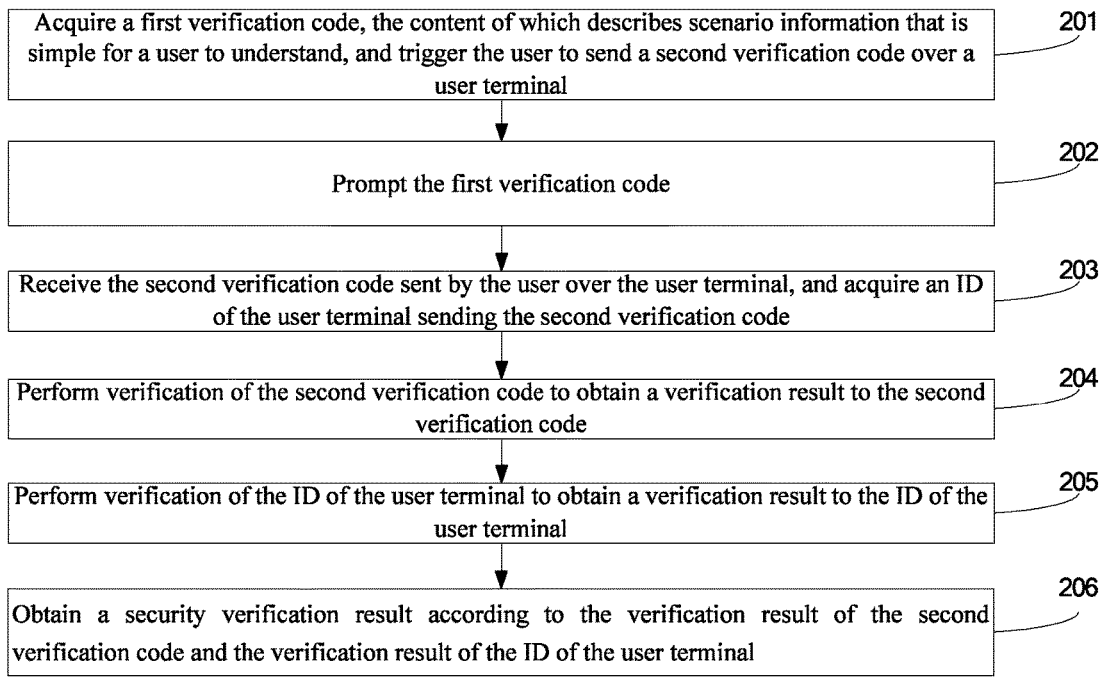
FIG. 2 is a flowchart of a security verification method according to an embodiment of the present disclosure.

The memory 120 may be configured to store software programs and modules, such as software programs and modules corresponding to the rear-end equipment for processing services and the front-end equipment for processing services in the embodiment illustrated in FIG. 2. The processor 180 executes various functional applications and data processing, for example, processing services, by running the software programs and modules stored in the memory 120. The memory 120 mainly includes a program storage partition and a data storage partition. The program storage partition may store an operating system, at least one application for implementing a specific function (for example, audio playing function, image playing function, and the like). The data storage partition may store data created according to use of the terminal 1400 (for example, audio data, address book, and the like). In addition, the memory 120 may include a high speed random access memory, or include a non-volatile memory, for example, at least one disk storage device, a flash memory device, or another non-volatile solid storage device. Correspondingly, the memory 120 may further include a memory controller, for providing access to the memory 120 for the processor 180 and an input unit 130.

The inputting unit 130 may be configured to receive input digits and characters, and generate signal input of a keyboard, a mouse, an operation rod, an optical or track ball related to user settings and function control. Specifically, the inputting unit 130 may include a touch-sensitive surface 131 and another inputting device 132. The touch-screen surface 131 is also referred to as a touch screen or a touch control plate, is capable of collecting a touch operation performed by a user thereon or therearound (for example, an operation performed by the user using fingers, touch pens, or other suitable objects or accessories on or around the touch-sensitive surface 131), and drive a corresponding connection apparatus according to a preset program. Optionally, the touch-sensitive surface 131 may include a touch detecting apparatus and a touch controller. The touch detecting apparatus detects a touch azimuth of the user, detects a signal generated by the touch operation, and transmits the signal to the touch controller. The touch controller receives touch information from the touch detecting apparatus, transforms the information into a touch point coordinate, sends the coordinate to the processor 180, and receives a command issued by the processor 180 and run the command. In addition, resistive, capacitive, infrared, and surface acoustic wave technologies may be used to implement the touch-sensitive surface 131. In addition to the touch-sensitive surface 131, the input unit 130 may further include another input device 132. Specifically, the another inputting device 132 includes but not limited to one or a plurality of a physical keyboard, a function key (for example, a volume control key, and a switch key), a track ball, a mouse, an operation rod, and the like.

The display unit 140 may be configured to display information input by the user or information provided to the user, and various graphical user interfaces of the terminal 1400. These graphical user interfaces may be formed by graphics, texts, icons, and videos or any combination thereof. The display unit 140 may include a display panel 141. Alternatively, the display panel 141 may be configured by using a liquid crystal display (LCD), an organic light-emitting diode (OLED) or the like. Further, the touch-sensitive surface 131 may cover the display panel 141. When detecting a touch operation thereon on therearound, the touch-sensitive surface 131 transfers the operation to the processor 180 to determine the type of the touch event. Subsequently, the processor 180 provides corresponding visual output on the display panel 141 according to the type of the touch event. In FIG. 14, although the touch-screen surface 131 and the display panel 141 are two independent components to implement input and output functions. However, in some embodiments, the touch-sensitive surface 131 may be integrated with the display panel 141 to implement the input and output functions.

The terminal 1400 may further include at least one sensor 150, for example, a light sensor, a motion sensor, or another type of sensor. Specifically, the optical sensor may include an ambient light sensor and a proximity sensor, where the ambient light sensor is capable of adjusting luminance of the display panel 141 according to the intensity of the ambient light, and the proximity sensor is capable of shutting the display panel 141 and/or backlight when the terminal 1400 is moved to the ears. As a type of motion sensor, a gravity sensor is capable of detecting the acceleration of each direction (typically three axes), and when in the static state, is capable of the magnitude and direction of the gravity. The gravity sensor may be applicable to an application for recognizing mobile phone gestures (for example, switching between horizontal and vertical screens, and gesture calibration in games and magnetometers), and provides the vibration-based recognition function (for example, pedometers and knocks). The terminal 1400 may further include a gyroscope, a barometer, a hygrometer, a thermometer, and other sensors such as an infrared sensor, which are not described herein any further.

The audio circuit 160, a loudspeaker 161, and a microphone 162 are capable of providing audio interfaces between the user and the terminal 1400. The audio circuit 160 is capable of transmitting an electrical signal acquired by converting the received audio data to the loudspeaker 161. The loudspeaker 161 converts the electrical signal into a voice signal for output. In another aspect, the microphone 162 converts the collected voice signals into the electrical signals, and the audio circuit 160 converts the electrical signals into audio data, and then outputs the audio data to the processor 180 for processing. The processed audio data is transmitted by the RF circuit 110 to another terminal; or the processed audio data is output to the memory for further processing. The audio circuit 160 may further include an earphone plug for providing communication of an external earphone with the terminal 1400.

The terminal 1400 may assist a user to receive or send E-mails, browse webpage and access streaming media using the transmission module 170, thereby providing the access to wireless or wired wideband internet for the user. Although, the transmission module 170 is illustrated in FIG. 14, it may be understood that the transmission module 170 is not a mandatory constituent of the terminal 800 and may be omitted as required without changing the scope of the essence of the present disclosure.

The processor 180 is a control center of the terminal 1400, and connects all parts of a mobile phone by using various interfaces and lines, and implements various functions and data processing of the terminal 1400 to globally monitor the mobile phone, by running or performing software programs and/or modules stored in the memory 120 and calling data stored in the memory 120. Optionally, the processor 180 may include at least one processor core. Preferably, the processor 180 may integrate an application processor and a model processor, where the application processor is mainly responsible for processing the operating system, user interface, and application program; and the modem processor is mainly responsible for performing wireless communication. It may be understood that the modem processor may also not be integrated in the processor 180. The terminal 1400 further includes a power supply 190 (for example, a battery) supplying power for all the components. Preferably, the power supply may be logically connected to the processor 180 by using a power management system, such that such functions as charging management, discharging management, and power consumption management are implemented by using the power supply management system. The power supply 990 may further include at least one DC or AC power supply, a recyclable charging system, a power fault detection circuit, a power converter or inverter, a power state indicator, and the like.

The terminal 1400 may further comprise a power supply 190 (for example, a cell) for supplying power to all components. Preferably, the power supply may be in logic connection with the processor 180 using a power management system so as to implement charge, discharge, power consumption management and other functions using the power management system. The power supply 190 may also comprise one or more DC or AC power supplies, a recharge system, a power failure detection circuit, a power converter or inverter, a power status indicator or any other components.

Although no detail illustration is given, the terminal 1400 may further include a camera, a Bluetooth module, and the like, which is not described herein any further. Specifically, in this embodiment, the display unit of the terminal is a touch-screen display. The terminal further includes a memory and one or more programs, where the one or more programs are stored in the memory, and one or more processors are configured to execute instructions contained in the one or more programs for performing the following operations:

acquiring and prompting a first verification code, where the content of which describes scenario information that is simple for a user to understand, and triggering the user to send a second verification code over a user terminal;

receiving the second verification code sent by the user over the user terminal, and acquiring an ID of the user terminal sending the second verification code; and verifying the second verification code, verifying the ID of the user terminal, and obtaining a security verification result according to two verification results.

It is assumed that the above is a first possible implementation manner, in a second possible implementation manner based on the first possible implementation manner, the memory of the terminal further includes instructions for performing the following operations:

judging whether the second verification code is identical to the first verification code;

indicating that the verification of the second verification code is successful if the second verification code is identical to the first verification code; and indicating that the verification of the second verification code is failed if the second verification code is not identical to the first verification code.

In a third possible implementation manner based on the first possible implementation manner, the memory of the terminal further includes instructions for performing the following operations:

sending the second verification code to a verification apparatus where verification codes are pre-stored, such that the verification apparatus judges whether the second verification code is among the verification codes pre-stored in the verification apparatus and returns a first judgment result; and receiving the first judgment result returned by the verification apparatus, and obtaining a verification result to the second verification code according to the first judgment result.

In a fourth possible implementation manner based on the first possible implementation manner, the memory of the terminal further includes instructions for performing the following operation:

acquiring a user name and password currently input by a user;

judging whether the ID of the user terminal is among the pre-stored IDs;

indicating that the verification of the ID of the user terminal is failed if the ID of the user terminal is not among the pre-stored IDs; and judging whether the acquired user name and password are consistent with a pre-stored user name and password corresponding to the ID of the user terminal if the ID of the user terminal is among the pre-stored IDs; indicating that the verification of the ID of the user terminal is successful if the acquired user name and password are consistent with the pre-stored user name and password stored corresponding to the ID of the user terminal; and indicating that the verification of the ID of the user terminal is failed if the acquired user name and password are inconsistent with the pre-stored user name and password corresponding to the ID of the user terminal.

In a fifth possible implementation manner based on the first possible implementation manner, the memory of the terminal further includes instructions for performing the following operation:

acquiring a user name and password currently input by a user;

sending the acquired user name and password as well as the ID of the user terminal to a verification apparatus, such that the verification apparatus judges whether the ID of the user terminal and the user name and password are pre-stored in the verification apparatus, and returns a second judgment result; and receiving the second judgment result returned by the verification apparatus, and obtaining a verification result to the ID of the user terminal according to the second judgment result.

In a sixth possible implementation manner based on the first possible implementation manner, the memory of the terminal further includes instructions for performing the following operation:

granting a permission corresponding to the second verification code when the verification of the second verification code is successful and the verification of the ID of the user terminal is successful.

In a seventh possible implementation manner based on any one of first to sixth possible implementation manner, the memory of the terminal further includes instructions for performing the following operations:

acquiring current verification scenario information, the verification scenario information at least containing information about the type of a service described by a verification scenario;

acquiring a first verification code includes the following steps of:

searching, among the pre-stored verification codes, according to a preset mapping relationship between verification scenario information and verification codes, a verification code corresponding to the current verification scenario information, and using the searched verification code as the acquired first verification code.

In an eighth possible implementation manner based on any one of first to sixth possible implementation manners, the memory of the terminal further includes instructions for performing the following operation:

acquiring current verification scenario information, the verification scenario information at least containing information about the type of a service described by a verification scenario;

sending the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information; and receiving the verification code returned by the verification apparatus, and using the received verification code as the acquired first verification code.

In conclusion, for the terminal provided in this embodiment, a first verification code describing scenario information that is simple for a user to understand is displayed such that the user understands the scenario information corresponding to the first verification code and unauthorized users are prevented from stealing the verification codes using similar websites. In addition, a security verification result is obtained according to two verification results of the second verification code and the ID corresponding to the user terminal sending the second verification. In this way, unauthorized users are prevented from intercepting the verification codes and stealing the identity of a user by sending the verification codes over other user terminals, such that the function of the security verification is enhanced.

An embodiment of the present disclosure provides a computer readable storage medium. The computer readable storage medium may be the computer readable storage medium contained in the memory in the above embodiment, or a computer readable storage medium that is separate and not assembled in the terminal. The computer readable storage medium stores one or more programs by which one or more processors execute a security verification method. The method includes the following steps of:

acquiring and prompting a first verification code, the content of which describes scenario information that is simple for a user to understand, and triggering the user to send a second verification code over a user terminal;

receiving the second verification code sent by the user over the user terminal, and acquiring an ID of the user terminal sending the second verification code; and verifying the second verification code, verifying the ID of the user terminal, and obtaining a security verification result according to two verification results.

Supposed that the above is a first possible implementation manner, in a second possible implementation manner based on the first possible implementation manner, verifying the second verification code includes the following steps of:

judging whether the second verification code is identical to the first verification code;

indicating that the verification of the second verification code is successful if the second verification code is identical to the first verification code; and indicating that the verification of the second verification code is failed if the second verification code is not identical to the first verification code.

In a third possible implementation manner based on the first possible implementation manner, verifying the second verification code includes the following steps of:

sending the second verification code to a verification apparatus where verification codes are pre-stored, such that the verification apparatus judges whether the second verification code is among the verification codes pre-stored in the verification apparatus and returns a first judgment result; and receiving the first judgment result returned by the verification apparatus, and obtaining a verification result to the second verification code according to the first judgment result.

In a fourth possible implementation manner based on the first possible implementation manner, before verifying the ID of the user terminal, the method further includes the following step of:

acquiring a user name and password currently input by a user;

verifying the ID of the user terminal includes the following steps of:

judging whether the ID of the user terminal is among the pre-stored IDs;

indicating that the verification of the ID of the user terminal is failed if the ID of the user terminal is not among the pre-stored IDs; and judging whether the acquired user name and password are consistent with a pre-stored user name and password corresponding to the ID of the user terminal if the ID of the user terminal is among the pre-stored IDs; indicating that the verification of the ID of the user terminal is successful if the acquired user name and password are consistent with the pre-stored user name and password corresponding to the ID of the user terminal; and indicating that the verification of the ID of the user terminal is failed if the acquired user name and password are inconsistent with the pre-stored user name and password corresponding to the ID of the user terminal.

In a fifth possible implementation manner based on the first possible implementation manner, before verifying the ID of the user terminal, the method further includes acquiring a user name and password currently input by a user;

where the verifying the ID of the user terminal includes:

sending the acquired user name and password as well as the ID of the user terminal to a verification apparatus, such that the verification apparatus judges whether the ID of the user terminal and the user name and password are pre-stored in the verification apparatus, and returns a second judgment result; and receiving the second judgment result returned by the verification apparatus, and obtaining a verification result to the ID of the user terminal according to the second judgment result.

In a sixth possible implementation manner based on any one of the first to fifth possible implementation manners, different verification codes are corresponding to different permissions; and after the acquiring a security verification result according to two verification results, the method includes:

granting a permission corresponding to the second verification code when the verification of the second verification code is successful and the verification of the ID of the user terminal is successful.

In a seventh possible implementation manner based on any one of first to sixth possible implementation manners, before acquiring a first verification code, the method further includes the following step of:

acquiring current verification scenario information, the verification scenario information at least containing information about the type of a service described by a verification scenario;

acquiring a first verification code includes the following steps of:

searching, among the pre-stored verification codes, according to a preset mapping relationship between verification scenario information and verification codes, a verification code corresponding to the current verification scenario information, and using the searched verification code as the acquired first verification code.

In an eighth possible implementation manner based on any one of first to sixth possible implementation manners, before acquiring a first verification code, the method further includes the following step of:

acquiring current verification scenario information, the verification scenario information at least containing information about the type of a service described by a verification scenario;

acquiring a first verification code includes the following steps of:

sending the current verification scenario information to a verification apparatus where verification scenario information and verification codes are pres-tored, such that the verification apparatus searches and returns, among the pre-stored verification codes, according to a preset mapping relationship between verification scenario information and verification codes, a verification code corresponding to the current verification scenario information; and receiving the verification code returned by the verification apparatus, and using the received verification code as the acquired first verification code.

According to the computer readable storage medium provided in this embodiment, a first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced.

An embodiment of the present disclosure provides a graphic user interface, applied to a terminal comprising a touch-screen display, a memory and one or more processors for executing one or more programs. The graphic user interface is configured to:

acquire a first verification code and prompt the first verification code, the content of the first verification code describes scenario information that is simple for a user to understand, and trigger the user to send a second verification code over a user terminal;

receive the second verification code sent by the user over the user terminal, and acquire an ID of the user terminal sending the second verification code; and verify the second verification code, perform verification of the ID of the user terminal, and obtain a security verification result according to two verification results.

According to the graphic user interface provided in this embodiment, a first verification code describing scenario information that is simple for a user to understand is displayed such that the user understands the scenario information corresponding to the first verification code and unauthorized users are prevented from stealing the verification codes using similar websites. In addition, after a second verification code sent by a user over a user terminal is received and the ID of the user terminal sending the second verification code is acquired, a security verification result is obtained according to two verification results of the second verification code and the ID of the user terminal sending the second verification. In this way, unauthorized users are prevented from intercepting the verification codes and stealing the identity of a user by sending the verification codes over other user terminals, such that the function of the security verification is enhanced.

It should be noted that, during security verification by the security verification apparatus provided in the above embodiment, the apparatus is described by only using division of the above functional modules as an example. In practice, the functions may be assigned to different functional modules for implementation as required. To be specific, in terms of the internal structure, the apparatus is divided into different functional modules to implement all or part of the above-described functions. In addition, the security verification apparatus and terminal are based on the same inventive concept as the security verification method according to the embodiments of the present disclosure, where the specific implementation is elaborated in the method embodiments, which is not detailed herein any further.

The sequence numbers of the preceding embodiments of the present invention are only for ease of description, but do not denote the preference of the embodiments.

Persons of ordinary skill in the art should understand that all or part of steps of the preceding methods may be implemented by hardware or hardware following instructions of programs. The programs may be stored in a non-transitory computer-readable storage medium, and may be executed by at least one processor. The storage medium may be a read-only memory (ROM), a magnetic disk, or a compact disc-read only memory (CD-ROM).

Detailed above are merely exemplary embodiments of the present disclosure, and are not intended to limit the present disclosure. Any modifications, equivalent replacements and improvements made within the spirit and principle of the present disclosure shall fall into the protection scope of the present disclosure.

What is claimed is:

1. A security verification method, comprising:
acquiring a first verification code and promoting the first verification code, the content of the first verification code describing scenario information that is simple for a user to understand, and triggering the user to send a second verification code over a user terminal;
receiving the second verification code sent by the user over the user terminal, and acquiring an ID of the user terminal sending the second verification code; and
verifying the second verification code, verifying the ID of the user terminal, and obtaining a security verification result according to two verification results;
wherein prior to the verifying the ID of the user terminal, the method further comprises:
acquiring a user name and password currently input by a user;
wherein the verifying the ID of the user terminal comprises:
judging whether the ID of the user terminal is among the pre-stored IDs;
indicating that the verification of the ID of the user terminal is failed if the ID of the user terminal is not among the pre-stored IDs; and judging whether the acquired user name and password are consistent with a pre-stored user name and password corresponding to the ID of the user terminal if the ID of the user terminal is among the pre-stored IDs; indicating that the verification of the ID of the user terminal is successful if the acquired user name and password are consistent with the pre-stored user name and password corresponding to the ID of the user terminal; and indicating that the verification of the ID of the user terminal is failed if the acquired user name and password are not consistent with the pre-stored user name and password corresponding to the ID of the user terminal.

2. The method according to claim 1, wherein the verifying the second verification code comprises:
    judging whether the second verification code is identical to the first verification code;
    indicating that the verification of the second verification code is successful if the second verification code is identical to the first verification code; and
    indicating that the verification of the second verification code is failed if the second verification code is not identical to the first verification code.

3. The method according to claim 1, wherein the verifying the second verification code comprises:
    sending the second verification code to a verification apparatus where verification codes are pre-stored, such that the verification apparatus judges whether the second verification code is among the verification codes pre-stored in the verification apparatus and returns a first judgment result; and
    receiving the first judgment result returned by the verification apparatus, and obtaining a verification result to the second verification code according to the first judgment result.

4. The method according to claim 1, wherein prior to the acquiring a first verification code, the method further comprises:
    acquiring current verification scenario information, the verification scenario information at least containing information about the type of a service described by a verification scenario;
    wherein the acquiring a first verification code comprises:
    searching, among the pre-stored verification codes, according to a preset mapping relationship between verification scenario information and verification codes, a verification code corresponding to the current verification scenario information, and using the searched verification code as the acquired first verification code.

5. The method according to claim 1, wherein prior to the acquiring a first verification code, the method further comprises:
    acquiring current verification scenario information, the verification scenario information at least containing information about the type of a service described by a verification scenario;
    wherein the acquiring a first verification code comprises:
    sending the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information; and receiving the verification code returned by the verification apparatus, and using the received verification code as the acquired first verification code.

6. A security verification apparatus, comprising:
    one or more processors; and
    a non-transitory computer-readable storage medium storing instructions that, when executed by the one or more processors, cause the one or more processors to perform operations comprising:
    acquiring a first verification code;
    prompting the first verification code, the content of the first verification code describing scenario information that is simple for a user to understand; and triggering the user to send a second verification code over a user terminal;
    receiving the second verification code sent by the user over the user terminal;
    acquiring an ID of a user terminal sending the second verification code;
    verifying the second verification code;
    verifying the ID of the user terminal; and
    obtaining a security verification result according to two verification results obtained;
    wherein the operations further comprises: acquiring a user name and password currently input by a user;
    the verifying the ID of the user terminal comprises:
    judging whether the ID of the user terminal is among the pre-stored IDs; and
    indicating that the verification of the ID of the user terminal is failed when the ID of the user terminal is not among the pre-stored IDs; judging whether the acquired user name and password are consistent with the pre-stored user name and password corresponding to the ID of the user terminal when the ID of the user terminal is among the pre-stored IDs; indicating that the verification of the ID of the user terminal is successful if the acquired user name and password are consistent with the pre-stored user name and password corresponding to the ID of the user terminal; and indicating that the verification of the ID of the user terminal is failed if the acquired user name and password are inconsistent with pre-stored the user name and password corresponding to the ID of the user terminal;
    or, the verifying the ID of the user terminal comprises:
    sending the acquired user name and password as well as the ID of the user terminal to a verification apparatus, such that the verification apparatus judges whether the ID of the user terminal and the user name and password are pre-stored in the verification apparatus, and returns a second judgment result; and
    receiving the second judgment result returned by the verification apparatus, and obtain a verification result to the ID of the user terminal according to the second judgment result.

7. The apparatus according to claim 6, wherein the verifying the second verification code comprises:
    judging whether the second verification code is identical to the first verification code;
    indicating that the verification of the second verification code is successful when the second verification code is identical to the first verification code; and indicatingthat the verification of the second verification code is failed when the second verification code is not identical to the first verification code.

8. The apparatus according to claim 6, wherein the verifying the second verification code comprises:

sending the second verification code to a verification apparatus where verification codes are pre-stored, such that the verification apparatus judges whether the second verification code is among the verification codes pre-stored in the verification apparatus and returns a first judgment result; and receiving the first judgment result returned by the verification apparatus; and obtaining a verification result to the second verification code according to the first judgment result.

9. The apparatus according to claim 6, wherein, the operations further comprises:

acquiring current verification scenario information, the verification scenario information at least containing information about the type of a service described by a verification scenario;

the acquiring a first verification code comprises:

searching, among the pre-stored verification codes, according to a preset mapping relationship between verification scenario information and verification codes, a verification code corresponding to the current verification scenario information, and using the searched verification code as the acquired first verification code.

10. The apparatus according to claim 6, wherein the operations further comprises:

acquiring current verification scenario information, the verification scenario information at least containing information about the type of a service described by a verification scenario;

the acquiring a first verification code comprises:

sending the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information;

receiving the verification code returned by the verification apparatus, and using the received verification code as the acquired first verification code.

11. The method according to claim 1, wherein different verification codes are corresponding to different permissions; and after the acquiring a security verification result according to two verification results, the method comprises:

granting a permission corresponding to the second verification code when the verification of the second verification code is successful and the verification of the ID of the user terminal is successful.

12. A security verification method, comprising:

acquiring a first verification code and promoting the first verification code, the content of the first verification code describing scenario information that is simple for a user to understand, and triggering the user to send a second verification code over a user terminal;

receiving the second verification code sent by the user over the user terminal, and acquiring an ID of the user terminal sending the second verification code; and verifying the second verification code, verifying the ID of the user terminal, and obtaining a security verification result according to two verification results;

wherein prior to the verifying the ID of the user terminal, the method further comprises the following step of:

acquiring a user name and password currently input by a user;

wherein verifying the ID of the user terminal comprises:

sending the acquired user name and password as well as the ID of the user terminal to a verification apparatus, such that the verification apparatus judges whether the ID of the user terminal and the user name and password are pre-stored in the verification apparatus, and returning a second judgment result; and receiving the second judgment result returned by the verification apparatus, and obtaining a verification result to the ID of the user terminal according to the second judgment result.

13. The method according to claim 12, wherein the verifying the second verification code comprises:

judging whether the second verification code is identical to the first verification code;

indicating that the verification of the second verification code is successful if the second verification code is identical to the first verification code; and indicating that the verification of the second verification code is failed if the second verification code is not identical to the first verification code.

14. The method according to claim 12, wherein the verifying the second verification code comprises:

sending the second verification code to a verification apparatus where verification codes are pre-stored, such that the verification apparatus judges whether the second verification code is among the verification codes pre-stored in the verification apparatus and returns a first judgment result; and receiving the first judgment result returned by the verification apparatus, and obtaining a verification result to the second verification code according to the first judgment result.

15. The method according to claim 12, wherein prior to the acquiring a first verification code, the method further comprises:

acquiring current verification scenario information, the verification scenario information at least containing information about the type of a service described by a verification scenario;

wherein the acquiring a first verification code comprises:

searching, among the pre-stored verification codes, according to a preset mapping relationship between verification scenario information and verification codes, a verification code corresponding to the current verification scenario information, and using the searched verification code as the acquired first verification code.

16. The method according to claim 12, wherein prior to the acquiring a first verification code, the method further comprises:

acquiring current verification scenario information, the verification scenario information at least containing information about the type of a service described by a verification scenario;

wherein the acquiring a first verification code comprises:

sending the current verification scenario information to a verification apparatus where verification scenario information and verification codes are pre-stored, such that the verification apparatus searches and returns, among the pre-stored verification codes, according to a preset mapping relationship between verification scenario information and verification codes, a verification code corresponding to the current verification scenario information; and receiving the verification code returned by the verification apparatus, and using the received verification code as the acquired first verification code.

17. The method according to claim 12, wherein different verification codes are corresponding to different permissions; and
after the acquiring a security verification result according to two verification results, the method comprises:
granting a permission corresponding to the second verification code when the verification of the second verification code is successful and the verification of the ID of the user terminal is successful.

18. The apparatus according to claim 6, wherein the operations further comprises:
granting a permission corresponding to the second verification code when the verification of the second verification code is successful and the verification of the ID of the user terminal is successful;
wherein, different verification codes correspond to different permissions.

* * * * *